March 24, 1936.   J. B. MENTON   2,034,875
HINGE AND DRAIN TROUGH FOR WINDSHIELDS
Filed March 15, 1932
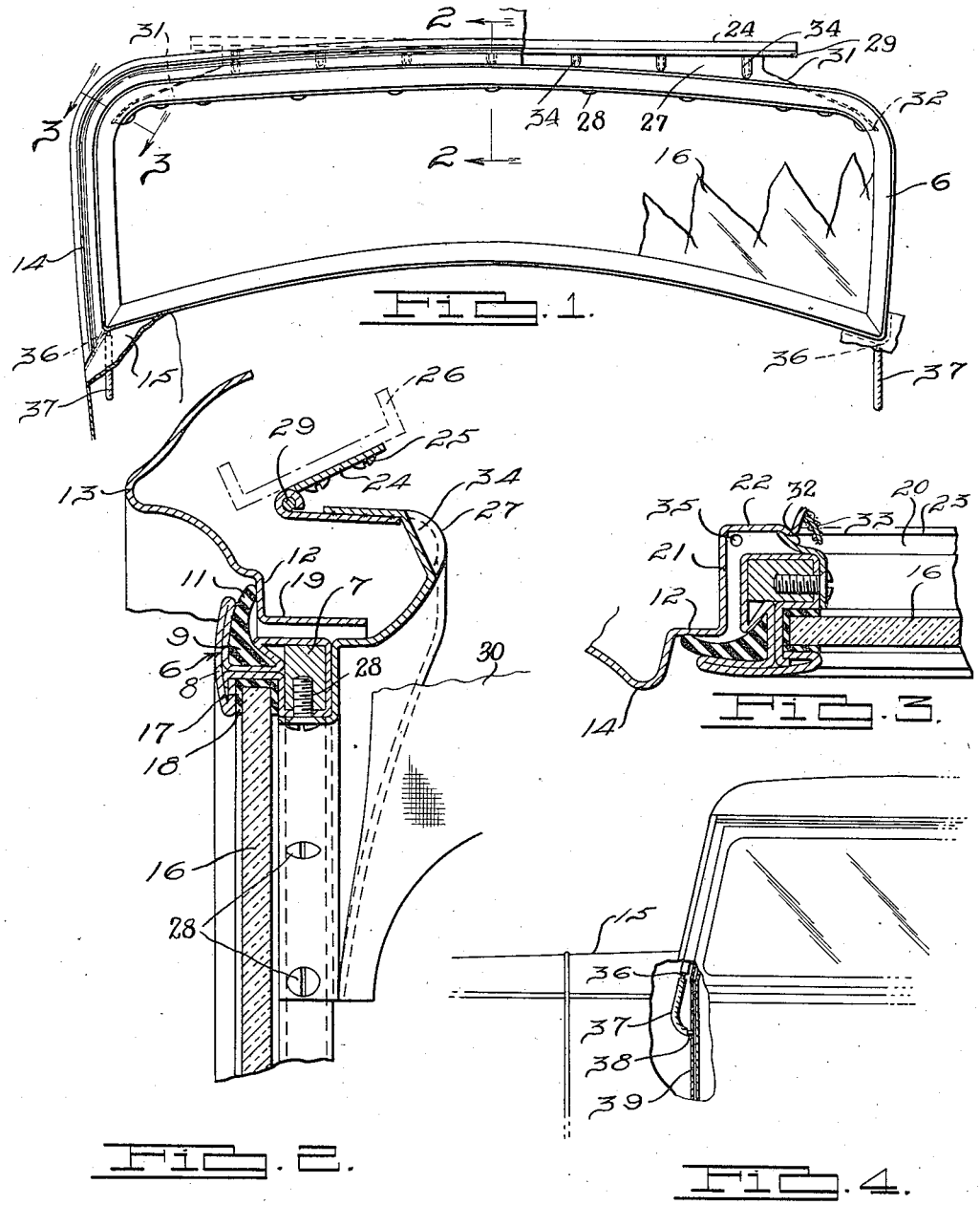
INVENTOR
Joseph B. Menton.
BY
Harness, Dickey, Pierce & Hann.
ATTORNEYS.

Patented Mar. 24, 1936

2,034,875

UNITED STATES PATENT OFFICE 2,034,875

HINGE AND DRAIN TROUGH FOR WINDSHIELDS

Joseph B. Menton, Detroit, Mich., assignor to The Murray Corporation of America, a corporation of Delaware Application March 15, 1932, Serial No. 598,965

15 Claims. (Cl. 296—92)

My invention relates to windshields for vehicles and particularly to a hinge for a windshield which is extended to form a trough for draining the water which may percolate between the joist between the windshield and casement and to the method of draining the water to a point exterior of the vehicle.

It has been the practice in the past to rely solely upon the sealing element provided about a windshield for forming a tight joint to prevent the infiltration of moisture or rain at the edges of the windshield to within the vehicle body. Since the windshield is repeatedly opened and closed, the material of the sealing element becomes damaged, warped or loses its resiliency and as a result a defective seal ensues which admits moisture within the body. When the leak occurs above the top of the windshield, the water drips downwardly and runs over the inner surface of the windshield glass and hinders or entirely destroys the vision of the operator. In a heavy rain, the water may run over the instrument board onto the limbs of the operator which extend thereunder and is, of course, very objectionable.

I completely seal a windshield from the ingress of water by providing a hinge which extends across the entire top edge of the windshield for supporting the windshield and for permitting the windshield to be opened outwardly relative to the front portion of the body. The side extensions of the hinges are flanged upwardly slightly on the outer edge for the purpose of forming a drain trough which projects within the pillar paneling, inwardly of a bead, for delivering any water which may collect within the hinge structure to the pillar. The water is retained by the bead, as it runs downwardly along the pillar to the corner formed by the cowl or lower window ledge from which it is drained to a region outside the vehicle body. The seal, spoken of hereinbefore as being employed for sealing the edge of the windshield frame relative to the windshield ledge, is utilized for the purpose of preventing moisture entering within the vehicle body. When, however, the seal is defective and water is permitted to enter the space above the top of the windshield, it will be caught in the hinge structure and will be carried by the trough formed therein to the side of the vehicle body into the region of the pillar and will never be apparent to an operator.

Accordingly, the main objects of my invention are; to provide a hinge for a windshield with a drain trough therein and in continuation thereof which permits the windshield to be opened in the ordinary manner; to provide troughs on the ends of the hinge structure which extend into a region of the pillars for delivering the water collected in the hinge to the sides of the pillars; to provide a bead or ridge on the rabbet formed on the pillar at the windshield opening to prevent the water delivered on the inner side of the rabbet from flowing outwardly into the body; to provide a draining system at the corners formed by the pillar and lower windshield ledge for draining the water collected therein to a region outside of the car body; and, in general, to provide a windshield construction which is sealed against the ingress of moisture and supported by a hinge having a drain trough embodied therein for collecting the moisture that may escape through the seal to prevent the percolation of water to within the vehicle body.

Other objects and features of novelty of my invention will be either specifically pointed out or will become apparent when referring, for a better understanding of my invention, to the following description in conjunction with the accompanying drawing, wherein:

Figure 1 is a broken view, in front elevation, of a windshield and support which embodies features of my invention;

Fig. 2 is an enlarged sectional view of the structure illustrated in Fig. 1, taken on the line 2—2 thereof;

Fig. 3 is an enlarged sectional view of the structure illustrated in Fig. 1, taken on the line 3—3 thereof; and Fig. 4 is a broken view in side elevation of a vehicle embodying features of my invention.

This invention is an improvement of the windshield hinge construction described and claimed in the co-pending application of A. E. Northup, Serial No. 537,350, filed May 14, 1931, and assigned to the assignee of the present invention. The particular type of hinge construction described therein, made possible various improvements in the vehicle front construction, arising from the provision of an arcuate shape to the top of the windshield frame which was hingedly supported for outward swinging movement, and which were never utilized theretofore on vehicle bodies. The arcuate shape to the upper portion of the windshield reduced the vertical width of the header construction because of its arcuate parallel relation to the edge of the windshield and increased the vision of the operator, enhanced the appearance of the front end of the vehicle, permitted the streamlining of the windshield and header construction, eliminated the air pocket which was present when the visor or visor extension of the roof was employed, and in addition, permitted the lowering of the vehicle in accordance with the trend of the art.

The present invention is an improvement over the hinge support described and claimed in the above mentioned co-pending application, in that the hinge is a continuous element rather than being provided in two parts and which is further extended sidewardly along the top edge of the windshield frame to constitute a drain trough along the entire top edge of the windshield.

In the drawing, I have illustrated a windshield frame 6 having a central body element 7 about which the sheet paneling 8 is formed in a configuration as illustrated clearly in Figs. 2 and 3. An outer pocket 9, formed about the outer periphery of the frame, receives a sealing element 11, of rubber or similar material, which engages the rabbet 12 provided on the inner edge of header panel 13, the side pillar panel 14 and the cowl panel 15. A sheet of glass 16, which constitutes the windshield, is supported on the inner periphery of the frame 6 in a channel 17 formed therein and in which a shock resisting element 18 is disposed in accordance with the practice of the art.

The metal forming the rabbet 12 of the header panel 13, extends inwardly therefrom, at 19, forming a flange which projects across the top of the windshield opening and is of arcuate shape conforming to the arcuate shape of the top element of the windshield frame 6. The extension 19 is joined to a flange 21, which is an extension of the rabbet 12 along the side pillars 14, forming the sides of the window ledge which in turn are joined to a flange 20 at the lower edge of the window opening which, is an extension of the cowling 15. The flanges 21 at the side of the pillars, extend laterally in a plane of the rabbet 12, as at 22, of such length as to mate with the edge of the windshield framing 6. The flange 22 joins a similar flange 23 that projects upwardly from the horizontally disposed flange 20 of the cowling to have the angle shaped recess, formed thereby and by the sides 21 and 22, extend along the pillars 14 and the cowl 15 for receiving the windshield frame 6.

For supporting the windshield frame within the windshield opening, I have provided a hinge 24 in the nature of a longitudinally extending piano hinge which has one branch attached by bolts 25 to a header 26 and which has the other branch welded or otherwise secured to an arcuate shaped interconnecting member 27 which is secured to the windshield frame 6 by a plurality of screws 28. The unit hinge formed in this manner, that is to say, by the piano hinge portion 24 and the arcuate shaped extension 27, projects across substantially the entire width of the vehicle body at the window opening and thereby constitutes a rigid and permanent support for the windshield which permits the windshield to be swung outwardly about the pivot 29 of the hinge.

The end portion 31 of the arcuate extending portion 27 of the hinge, is continued laterally beyond the hinge portion 24 to form drain troughs. The ends 32 of the troughs extend to the region of the pillars 14 for the purpose of delivering any water that may be collected in the hinge to the top of the pillars where the ends 32 join the flanges 22. The flanges are provided with a bead or ridge 33, as illustrated in Fig. 3, for the purpose of retaining the water inwardly thereof as it runs down the inner surface of the flanges. For adding additional strength to the hinge, I have broken up the continuity of the arcuate shaped portion 27, at 34, as illustrated in Figs. 1 and 2.

An inner finish panel 30 is mounted across the inner top portion of the vehicle about the top of the windshield opening to enclose the hinge and to hide the hinge portions 24, 27 and 29 from view within the header construction formed by the header 26, the outer panel 13 and the inner panel 30.

It will be understood that the sealing element 11 substantially seals the windshield frame 6 when drawn against the rabbet 12 about the window opening, but that in case the windshield is not properly closed or the material 11 has become worn, damaged or loses its resiliency to permit water to leak by the seal, it will be prevented from reaching the inside area of the vehicle because of the bead on the flange 22 and the extension 31 on the hinge which constitutes a drain system for the windshield opening.

At the lower edge of the opening at the sides of the pillars, that is to say, at the corners formed by the junction between the flanges 20 and 21, I have provided apertures 35 which are connected to a conduit 36 over which a flexible conductor or hose 37 is disposed and connected to point outwardly of the vehicle body. In Fig. 4, I have illustrated a conduit 38 as being connected to the front pillar post 39 at the door opening communicating with the exterior of the post and to which the one end of the flexible conductor 37 is connected. In this construction, water draining from either aperture 35 at the window opening will pass through the pipe 36, the conductor 37 and the pipe 38 to the outer surface of the door pillar 39 to flow downwardly between the outer surface of the pillar and the door rail and away from the vehicle interior. It is to be understood that I am not limited to draining the water at this point but, as pointed out hereinabove, may run the flexible tubing 37 to a conduit extending through the body at any point which may be convenient.

It will thus be seen, that I have provided a unit hinge and drain trough which is attached to the inner surface of the windshield for supporting the frame for arcuate movement. The hinge is so constructed and supported on the header inwardly of the outer header panel as to be substantially invisible and to permit the upper edge of the windshield and windshield frame to be of arcuate shape. The unit hinge extends substantially across the entire width of the windshield and is further extended at each end in the nature of a drain trough which cooperates with the side pillar panels for draining the water which may collect within the hinge into recesses provided in the pillar panels to permit the water to be drained to the lower corners of the windshield openings and to be conducted therefrom to a point exterior of the vehicle. In this construction the windshield hinge and draining system is invisible both to the operator and to an observer and is effective for collecting any water that may pass by the outer sealing element and conducting it from about the windshield opening without having the water enter the vehicle body.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A unit windshield hinge having one branch supported on the header of a vehicle body and entirely concealed between the outer and inner header finish panels, and a second branch extending downwardly therefrom and engaging the windshield frame.

2. A unit windshield hinge including, in combination, two wing elements joined together by a longitudinally extending pivot, one of said wings extending downwardly and of arcuate lateral shape conforming to the lateral arcuate shape of the windshield frame to which it is attached.

3. A unit windshield hinge including, in combination, two wing elements joined together by a longitudinally extending pivot, one of said wing elements extending away from said pivot and downwardly in a reverse curve, and further curved across its longitudinal dimension to conform to the curvature of a windshield frame to which it is attached.

4. A windshield for a vehicle body, a hinge extending a substantial distance across said windshield and having extensions at each end forming drain troughs at the sides of said windshield.

5. An arcuate windshield frame for a vehicle, a hinge having an arcuate portion extending a substantial distance across said windshield and provided with extensions sloping toward the sides of the frame in the nature of drain troughs.

6. The combination with the front of a vehicle body provided with a windshield opening and having a flange thereabout, of a windshield frame positioned in said opening, a hinge attached to said frame for swingably supporting the windshield, and extensions on said hinge projecting into the flange at the windshield opening and constituting a drain trough for the upper edge of the frame.

7. The combination with the front of a vehicle body provided with a windshield opening and a flange thereabout, of a windshield frame positioned in said opening, a sealing element extending between said frame and the outer surface of the vehicle body at said opening, a hinge for said windshield, and a trough in said hinge extending across the inner side of said windshield at its top edge and constituting a drain therefor.

8. The combination with the front end of a vehicle body provided with a windshield opening formed by the header, the cowl and the two side pillar panels, of a windshield having a frame thereabout for closing said opening, a drain trough provided along the inner edge of the windshield frame at the top portion thereof and extending into a rabbet provided in the side pillar posts, and means for conducting the moisture from said rabbets to a point exterior of the body.

9. The combination with a windshield provided on the front end of a vehicle body, of sealing means provided between the windshield frame and the outer surface of said body, a hinge for said windshield, a drain trough in said hinge extending along the top edge of said frame interiorly of the body, and means for draining said trough to a point exterior of the body.

10. The combination with a windshield and a vehicle body, of a hinge supporting said windshield thereon for swinging movement, extensions on said hinge at the top of the windshield forming drain troughs therefor, and means for conducting the moisture collected in said drain trough to a point exterior of the body.

11. The combination with an arcuate shaped windshield and a vehicle body, of a hinge having a longitudinally extending pivot and an arcuate shaped wing for engaging and supporting the windshield, extensions on said hinge projecting to the ends of said frame for draining the hinge of moisture which may collect therein, and means for conducting said moisture to a point exterior of said vehicle body.

12. The combination with a vehicle body having a windshield opening therein, of a hinge having the joined edge disposed inwardly of the edge of the front panel which defines the windshield opening and also disposed above said edge.

13. The combination with a windshield and a vehicle body, of a hinge having the joined edge disposed inwardly of the vehicle with a wing thereof forming a trough with the windshield which is extended laterally and sloped downwardly at the windshield sides.

14. A unit windshield hinge for a vehicle body having one branch secured to a support which is hidden by the front roof panel of said vehicle body, and a second branch extending downwardly therefrom and secured to the windshield.

15. A unit windshield hinge for a vehicle body including, in combination, two branches pivoted together, means for securing one of said branches to a support disposed behind the vehicle roof panel and hidden from view from the front of the vehicle body, and another branch extending therefrom and supporting a windshield.

JOSEPH B. MENTON.